(12) United States Patent
Radhakrishnan et al.

(10) Patent No.: US 8,595,479 B2
(45) Date of Patent: Nov. 26, 2013

(54) AGGREGATION OF CRYPTOGRAPHY ENGINES

(75) Inventors: Chandramouli Radhakrishnan, San Jose, CA (US); Timothy Andre, Los Gatos, CA (US); Immanuel Rahardja, Fremont, CA (US); Saurabh Mohan, Los Angeles, CA (US); Xiaoyi Liu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1058 days.

(21) Appl. No.: 12/392,217

(22) Filed: Feb. 25, 2009

(65) Prior Publication Data

US 2010/0217971 A1     Aug. 26, 2010

(51) Int. Cl.
*H04L 29/06* (2006.01)
(52) U.S. Cl.
USPC ........................................................ 713/153
(58) Field of Classification Search
USPC .................................................. 713/150, 153
See application file for complete search history.

(56) References Cited

U.S. PATENT DOCUMENTS

| 6,751,728 | B1 * | 6/2004 | Gunter et al. | 713/153 |
| 7,840,815 | B2 * | 11/2010 | Kakehi | 713/176 |
| 8,161,353 | B2 * | 4/2012 | Flynn et al. | 714/763 |
| 2003/0023846 | A1 | 1/2003 | Krishna et al. | |
| 2004/0077345 | A1 * | 4/2004 | Turner et al. | 455/423 |
| 2008/0130894 | A1 | 6/2008 | Qj et al. | |
| 2008/0247539 | A1 | 10/2008 | Huang et al. | |
| 2009/0208009 | A1 | 8/2009 | Hauge et al. | |
| 2010/0111292 | A1 | 5/2010 | Betouin et al. | |
| 2010/0332821 | A1 * | 12/2010 | Khalil et al. | 713/150 |

OTHER PUBLICATIONS

International Search Report for PCT application No. PCT/US2010/23336 dated Sep. 16, 2010 (3 pgs.).
Written Opinion of ISA for PCT application No. PCT/US2010/23336 dated Sep. 16, 2010 (3 pgs.).
Claims, PCT application No. PCT/US2010/23336, 4 pages.
Cisco Catalyst 6500 Architecture White Paper product information from http://www.cisco.com/en/US/prod/collateral/switches, pp. 1-25, dated Oct. 7, 2008.

* cited by examiner

*Primary Examiner* — Kambiz Zand
*Assistant Examiner* — Abiy Getachew
(74) *Attorney, Agent, or Firm* — Hickman Palermo Truong Becker Bingham Wong LLP (57) ABSTRACT

Systems, methods, and other embodiments associated with aggregation of cryptography engines are described. One example method includes receiving an outbound data packet on an outbound side of a data connection. The example method may also include analyzing the outbound data packet to determine a distribution value. The example method may also include selectively distributing the outbound data packet to one of a plurality of outbound processors based, at least in part, on the distribution value. The example method may also include receiving an inbound data packet on an inbound side of the data connection. The example method may also include examining the inbound data packet for an identifier. The example method may also include selectively distributing the inbound data packet to one of a plurality of inbound processors based, at least in part, on the identifier.

22 Claims, 8 Drawing Sheets

AGGREGATION OF CRYPTOGRAPHY ENGINES

BACKGROUND

Tunneling protocols may be used to secure data traffic over unsecure networks and/or to carry data traffic over an incompatible network. Virtual private networks (VPNs) may use tunneling protocols to secure communication between different locations to make the different network locations appear to be on the same network. Traditional embodiments of tunnels have utilized a single port of a single network card for communication between different network locations that span an unsecure network. However, a single port may have limited bandwidth and therefore limit the amount of data that can be transferred by the virtual tunnel. Conventional embodiments aggregate several physical Ethernet links (e.g. layer one links) to create a single logical Ethernet link. This allows the use of multiple data ports by a single virtual tunnel for the purpose of overcoming the bandwidth limits of a single data port. The use of multiple data ports allows for an increase in bandwidth of the virtual tunnel. For example, virtual tunnels that use four 10 Gbit/s ports may have a data transfer rate of 40 Gbit/s as opposed to a tunnel that uses a single port that has a 10 Gbit/s data transfer rate.

Additional data transfer limitations may be encountered when encryption of data packets is required to transfer data through tunnels that traverse networks. This encryption engine data transfer limitation is becoming common in networks due to the increased use of VPNs that require encryption by processors associated with network switches. Additionally, as computing power increases, the complexity of encryption processes increases to prevent code breaking by faster code breaking computers. For example, encryption software that once required a 40 bit encryption key may now require a key in the thousands of bits. Longer keys prevent modern code breaking computers from compromising the encryption. These longer keys increase the load on the processors associated with network switches.

The data packets that travel through a port and its associated network switch may be processed by a processor(s) of limited speed. Processor(s) associated with network switches may not encrypt and/or decrypt at the data transfer rate of the port. For example, a port may have a 10 Gbit/s transfer rate but the processor of the card may only be able to encrypt or decrypt data traffic at 1 Gbit/s. Therefore, the encryption and decryption speeds of a network switch may become a bottleneck on the data transferred through a virtual tunnel.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

In the past, bandwidth limits of a single data port on a network switch have been a limiting factor for virtual tunnels. However, systems like Etherchannel® aggregate traffic on a virtual tunnel through multiple ports to achieve higher data transfer rates than a single port. Aggregation may refer to link aggregation. Link aggregation is a term used in computer networking to describe the use of multiple Ethernet network ports in parallel to increase the data transfer speed beyond the limits of any one single port.

Encryption and decryption processing speeds of network switches may also be limiting factors (e.g. bottlenecks) when transferring secure data. Network switches may be limited in their processing power and may not be able to encrypt or decrypt data as quickly as the data transfer rate. Aggregation of data traffic based on encryption and decryption speeds may also decrease bottlenecks and increase the speeds of secure networks requiring data security. Aggregation or splitting network traffic of a data tunnel between different network switches facilitates parallel encryption and decryption processing by splitting traffic across engines. The parallel processing involves encryption and decryption using multiple encryption engines located on different network switches.

Link aggregation may allow multiple physical network links (e.g. layer one links) between two or more network switches (e.g. outbound switches) and another network switch(s) (e.g., inbound switch(s)) to be treated as a single logical link. Load balancing of the data traffic and/or the encryption processing across the available data links and/or processors may include selecting a link based on a hash function. A security association (SA) includes cryptographic information associated with encryption and decryption. To facilitate sharing crypto-engines, a method to select an SA may be needed. Therefore, a security association may also be selected as a function of the hash function. The hash function may hash an element of the data packet that is being transferred via a virtual tunnel. The element of the data packet may be a security parameter index (SPI), a media access control address (MAC), an Internet Protocol (IP) address, and so on. An IP address may be employed when the data packet is associated with a Group Encrypted Transport virtual private network (GetVPN), for example. A hash function may randomly distribute data packets that result in a real-world network speed or effective bandwidth for the logical link equal to the sum of the bandwidth of the individual physical link (e.g. ports). Distributing based on the hash function, which facilitates aggregation of bandwidth, may result in real-world encryption/decryption speeds equal to the sum of the cryptography engines.

In one outbound example, the aggregation of cryptography engines includes receiving an outbound data packet that is to be sent through an unsecure network. Aggregation may describe using multiple network switches and their associated processors to encrypt and decrypt data traffic in parallel to increase data transfer speed beyond the limits of a single network card and its associated processor(s). The outbound data packet may require encryption from a cryptography engine. The outbound data packet may be received from an aggregated crypto virtual group (ACVG) on an outbound side of a data connection. The ACVG may be associated with distributing data to aggregate bandwidth. A logic may analyze the outbound data packet to determine a distribution value that is used to selectively distribute (e.g. load balance) the outbound data packet to one of a plurality of encryption engines. The distribution value may be determined using a hash function. Selectively distributing outbound data packets to one of the plurality of encryption engines may allow for the parallel encryption of data packets and thus for aggregation of cryptography engines. An encrypted outbound packet may be transmitted across a data connection.

In one inbound example, aggregated cryptography engines may receive an inbound data packet on an inbound side of the data connection. The inbound data packet may be an encrypted data packet transmitted by a network switch on the outbound side of the data connection. A logic may examine the encrypted inbound data packet for an identifier. The identifier may be an SPI, a MAC address, and so on. A hash function may be performed on the identifier. The result of the hash function may be used to selectively distribute the data packet to one of a plurality of inbound processors and thus to a one of a plurality of crypto-engines. The distribution of inbound data packets to one of the plurality of inbound processors may allow for the parallel decryption of data packets and thus for aggregation of cryptography engines by the inbound processors.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
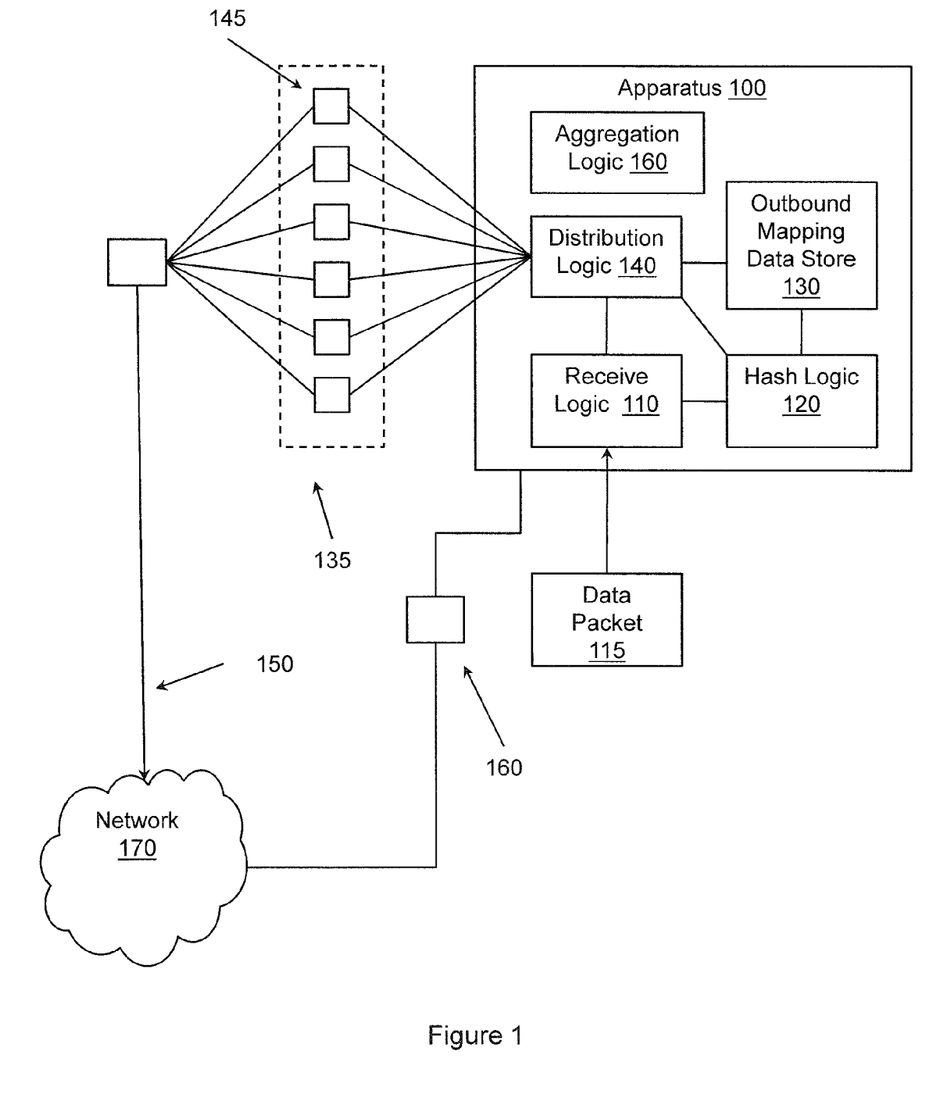
FIG. 1 illustrates an example apparatus associated with aggregation of multiple cryptography engines.

FIG. 1 illustrates an apparatus 100 associated with aggregating cryptography engines. Apparatus 100 may be associated with an outbound side of a hardware device. Apparatus 100 may include a receive logic 110 to receive a data packet 115 associated with an aggregated crypto virtual group (ACVG). The ACVG may be associated with distributing data to aggregate bandwidth in a distributed forwarding architecture. An ACVG may aggregate several physical links (e.g. layer one links) to create a single logical link. In one example, the physical links may be Ethernet links, though one skilled in the art will appreciate that other physical links may be employed. This facilitates using multiple data ports by a single virtual tunnel for the purpose of overcoming the bandwidth limits of a single data port. In another example, an ACVG may aggregate multiple encryption engines to allow for parallel encryption and decryption processing of data traffic. This facilitates increasing the speed of encryption through a virtual tunnel.

Apparatus 100 may also include a hash logic 120 to generate a hash value associated with the data packet 115. "Logic", as used herein with reference to FIGS. 1, 2, and 3 includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics. The hash value may be based on an element of the data packet 115. The element of the data packet 115 may be a security parameter index (SPI). The SPI is an identification tag added to the header while using Internet protocol security (IPSec) for tunneling the IP traffic. The hash value may be generated by a hash function that turns the element of the data packet 115 into a relatively small integer (e.g. the hash value) that may serve as an index for distribution of the data packet 115.

Apparatus 100 may also include an outbound mapping data store 130 to store a set of mappings between a set of hash values and a plurality of cryptography engines 135. "Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

Apparatus 100 may also include a distribution logic 140 to selectively distribute the data packet 115 to one of the plurality of cryptography engines 135 based, at least in part, on the hash value and the set of mappings. A cryptography engine 145 may then encrypt a data packet 115 for secure distribution across a data connection 150 associated with the ACVG. Selective distribution of the data packet 115 may achieve load balancing of encryption of data packets 115 between the plurality of cryptography engines 135. The hash value may be used to distribute data packets 115 equally, and/or in some other manner, between the plurality of cryptography engines 135. This results in different cryptography engines performing portions of the total processing. Multiple cryptography engines being used equally and/or in another manner is an example of encryption load balancing. In one embodiment, the receive logic 110, the hash logic 120, the distribution logic 140, and so on, are embodied in an Etherchannel logic.

In one embodiment, apparatus 100 may include an aggregation logic 160 to create a set of security associations (SOSAs). A SOSA enables secure communication between networking devices over a plurality of channels associated with the data connection 150. A security association (SA) is a logical grouping of security parameters that includes cryptographic keys, initialization vectors, digital certificates, and so on.

In one embodiment, the SA is to share security information between two networks. In this embodiment, data packets include a security parameter index (SPI) header that includes information that differentiates between the SOSAs of different data traffic streams. The SPI includes data to identify data encryption rules and data validation rules for data traffic streams.

In one embodiment, the aggregation logic 160 is to control transmission of an encrypted layer three (L3) switched frame over the data connection 150. The encrypted L3 switched frame may be encrypted by one of the plurality of cryptography engines 145. The L3 switched frame may include a data payload and a security parameter index (SPI) header.

The L3 network protocol is part of an open system interconnection (OSI) model that defines a networking framework for implementing protocols in seven layers. Control in this model is passed from one layer to the next, starting at the seventh layer and proceeding to the first layer. The layers from the seventh to the first are application, presentation, session, transport, network, data-link, and physical. The L3 layer is the network layer.

In one embodiment, the data connection 150 may be a tunnel (e.g. virtual tunnel) associated with a virtual private network (VPN). The tunnel may utilize a layer two tunneling protocol (L2TP) and/or an internet protocol security (IPSec). The tunnel may be a virtual tunnel that connects two networks through a network 170.

Figure 2:
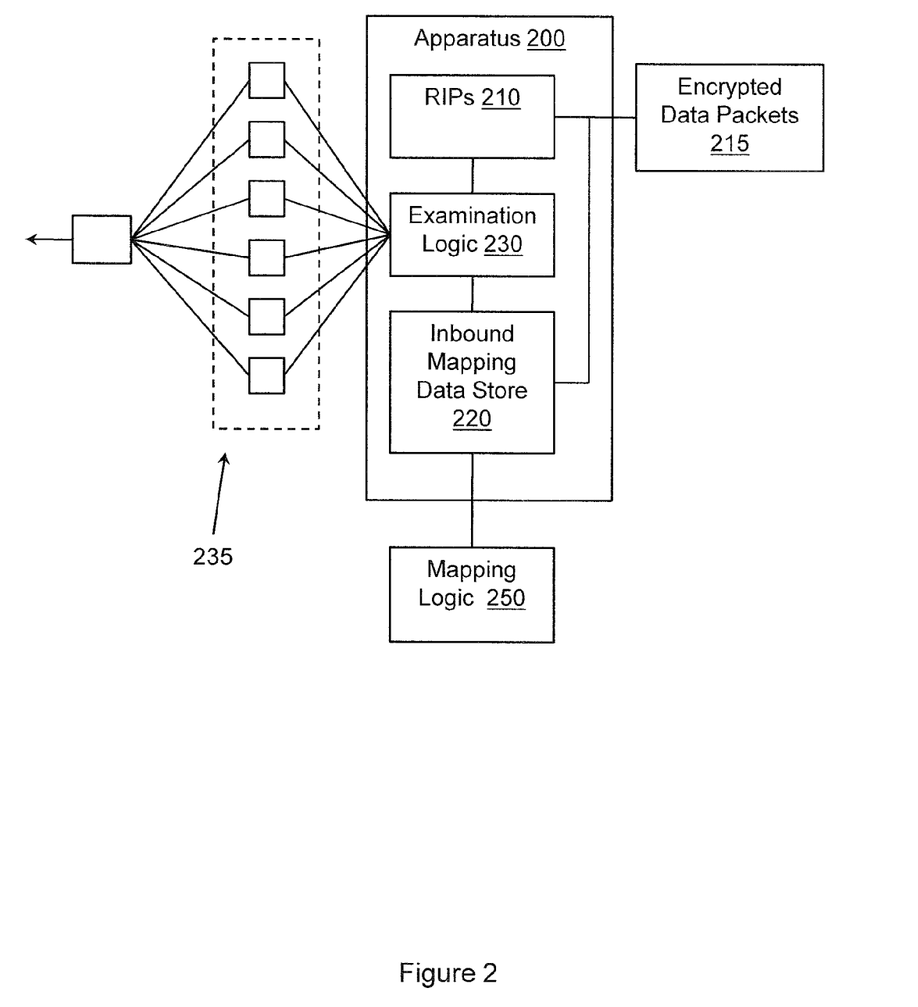
FIG. 2 illustrates an example apparatus associated with aggregation of cryptography engines.

FIG. 2 illustrates an apparatus 200 associated with aggregation of cryptography engines. Apparatus 200 includes a plurality of receive input ports (RIPs) 210 to receive encrypted data packets 215 associated with an ACVG. Apparatus 200 may include an inbound mapping data store 220 to store a set of mappings between hash values and decryption engines. Data stored in the inbound mapping data store 220 may determine which decryption engine an encrypted data packet 215 is sent to for decryption. Multiple decryption engines 235 may be utilized for the purpose of increasing the encryption and/or decryption speed of data traveling through a virtual tunnel. Thus, the cryptography engines 235 may be aggregated. This may be accomplished by parallel processing. In one embodiment, a decryption engine is to decrypt the encrypted data packet 215 based on information associated with a security parameter index (SPI).

Apparatus 200 may include an examination logic 230. The examination logic 230 may determine a hash value of an encrypted data packet 215 based, at least in part, on an element of the encrypted data packet 215. In one embodiment, the element of the encrypted data packet 215 that the hash value is determined upon is a security parameter index (SPI).

The examination logic 230 may selectively distribute the encrypted data packets 215 from one of the plurality of RIPs 210 to one of a plurality of decryption engines 235 based, at least in part, on the hash value and the mappings stored in the data store 220. One skilled in the art will realize that only part of the data packet may be encrypted. For example, the header of the data packet 215 may not be encrypted to allow the header to pass the data packet 215 through a network. The plurality of RIPs 210 may be located on network cards and/or network switches. RIPs 210 may be ports that connect the network card and/or network switch to external networks.

In one embodiment, the apparatus 200 includes a mapping logic 250 to create the set of mappings between hash values and the plurality of decryption engines 235. The mapping logic 250 provides the set of mappings between the hash values and the plurality of decryption engines 235 to the inbound mapping data store 220. Anti-replay attacks may be defeated by using different security associations. The different security associations may be selected as a function of the hashing. In one example, a security association may have its own anti-replay window.

Figure 3:
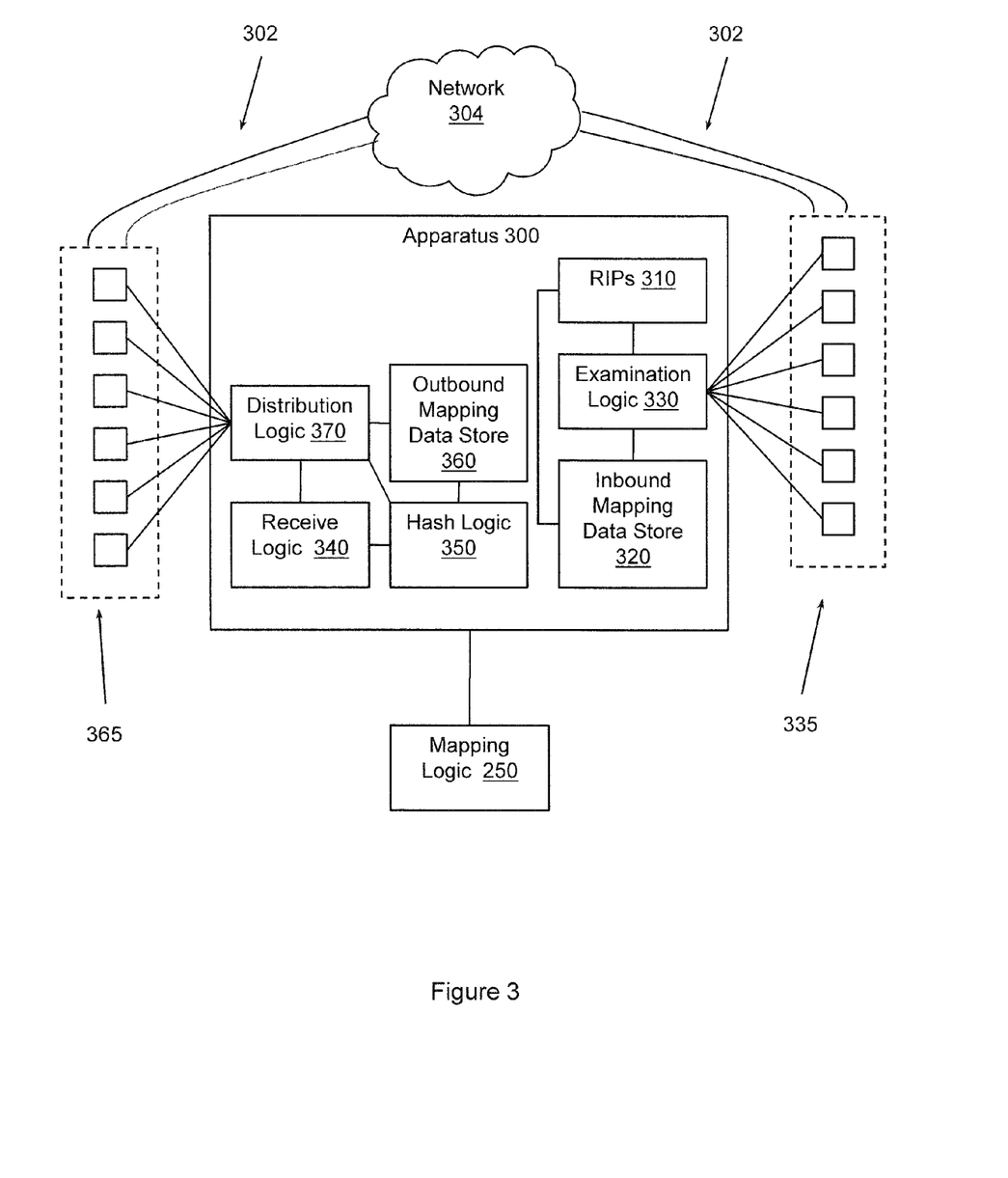
FIG. 3 illustrates an example apparatus associated with aggregation of cryptography engines.

FIG. 3 illustrates an example apparatus 300 associated with aggregation of cryptography engines. Apparatus 300 may include elements that are similar to apparatus 100 of FIG. 1 and apparatus 200 of FIG. 2. A data connection 302 may be a tunnel of a virtual private network (VPN) that travels through a network 304 like the Internet.

Apparatus 300 includes a plurality of receive input ports (RIPs) 310 to receive encrypted data packets associated with an ACVG. Apparatus 300 may include an inbound mapping data store 320 to store a set of mappings between hash values and decryption engines 335.

Apparatus 300 may include an examination logic 330. The examination logic 330 may determine a hash value of an encrypted data packet based, at least in part, on an element of the encrypted data packet. The examination logic 330 may also selectively distribute the encrypted data packets from one of the plurality of RIPs 310 to one of a plurality of decryption engines 335 based, at least in part, on the hash value and the mappings in the inbound mapping data store 320. The RIPs 310 may be similar to RIPs 210 of FIG. 2. The inbound mapping data store 320 may be similar to the inbound mapping data store 220 of FIG. 2. The examination logic 330 may be similar to the examination logic 230 of FIG. 2.

Apparatus 300 may also include a receive logic 340 to receive data packets associated with an ACVG on an outbound side of the data connection 302. The apparatus 300 may also include a hash logic 350 to generate an outbound hash value associated with the data packet. The outbound hash value is based on an element of the data packet to be encrypted and transmitted.

The apparatus 300 may also include an outbound mapping data store 360 to store a set of mappings between a set of hash values and a plurality of cryptography engines 365. The mappings may be provided, for example, by mapping logic 250. Thus, in one example, apparatus 300 may also include the mapping logic 250.

The apparatus 300 may also include a distribution logic 370 to selectively distribute the data packet to one of the plurality of cryptography engines 365 based, at least in part, on the outbound hash value. A cryptography engine may encrypt a data packet into an encrypted data packet for secure distribution across the data connection 302 associated with the ACVG. The receive logic 340 may be similar to receive logic 110 of FIG. 1. The hash logic 350 may be similar to the hash logic 120 of FIG. 1. The outbound mapping data store 360 may be similar to the outbound mapping data store 130 of FIG. 1. The distribution logic 370 may be similar to the distribution logic 140 of FIG. 1.

Figure 4:
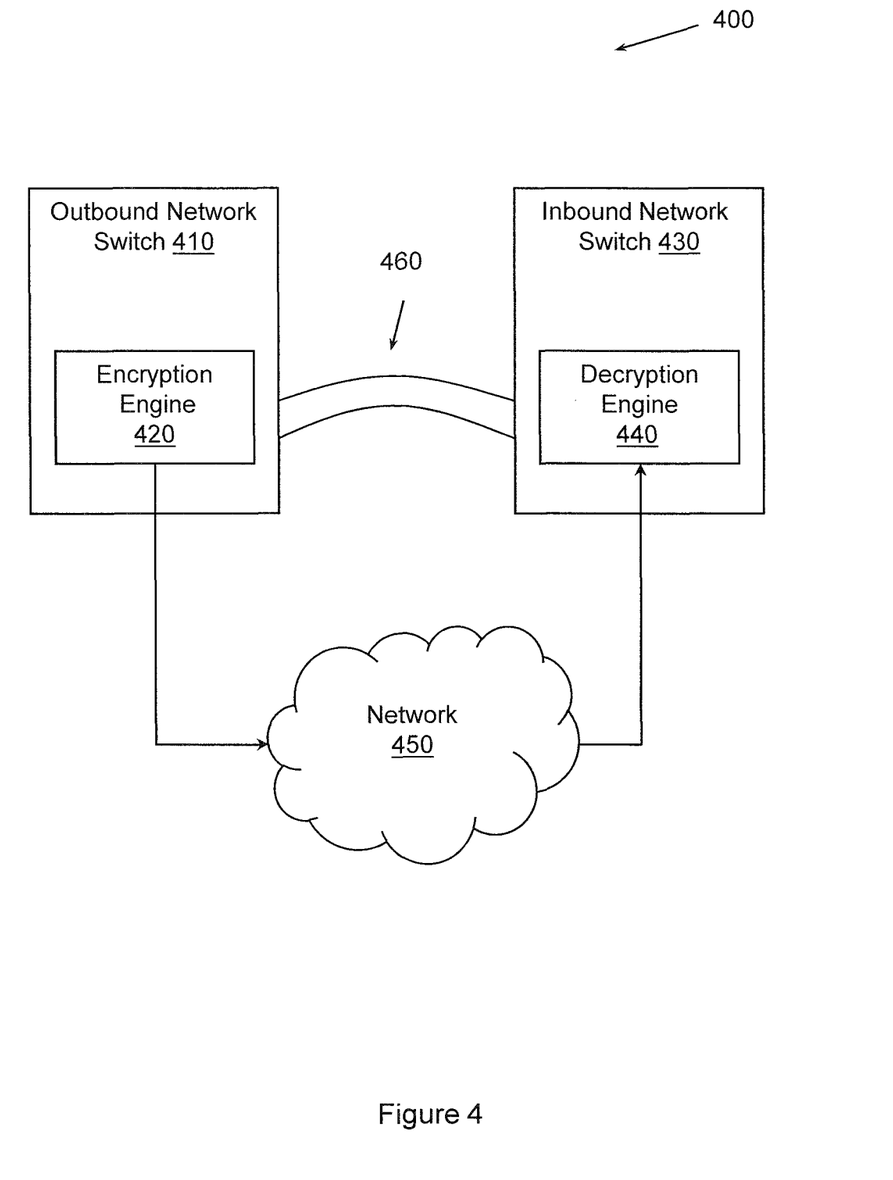
FIG. 4 illustrates an example environment associated with aggregation of cryptography engines.

FIG. 4 illustrates an example environment 400 associated with aggregation of cryptography engines. The environment 400 includes an outbound network switch 410 and an inbound network switch 430. The outbound network switch 410 and the inbound network switch 430 may be located at different physical locations and communicate with one another via a network 450. The outbound network switch 410 may include an encryption engine 420 to encrypt data packets that are passed through the network 450 to the inbound network switch 430. The inbound network switch 430 may include a decryption engine 440 to decrypt data packets that are passed through the network 450 from the outbound network switch 410.

A virtual tunnel 460 may communicate data packets through the network 450. The virtual tunnel 460 may be associated with a virtual private network (VPN). Virtual tunnel 460 may allow a user to view data on the VPN as if the data was on the same physical network (e.g. same physical location). However, the data may actually be on a different network. For example, data on outbound network switch 410 may appear to the user on the inbound network switch 430 (e.g. user network switch) as if the data resides on the inbound network switch 430. This occurs even though network 450 is located between outbound network switch 410 and inbound network switch 430. Encryption and data validation may be seamlessly performed on the data packets that travel through the network 450. For example, the encryption and data validation may be performed in the background without the request of the user or in some cases without the knowledge of the user. Data validation may include checking and verifying that the data was not altered while traversing the network 450.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

"Signal", as used herein, includes but is not limited to, electrical signals, optical signals, analog signals, digital signals, data, computer instructions, processor instructions, messages, a bit, a bit stream, or other means that can be received, transmitted and/or detected.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 5:
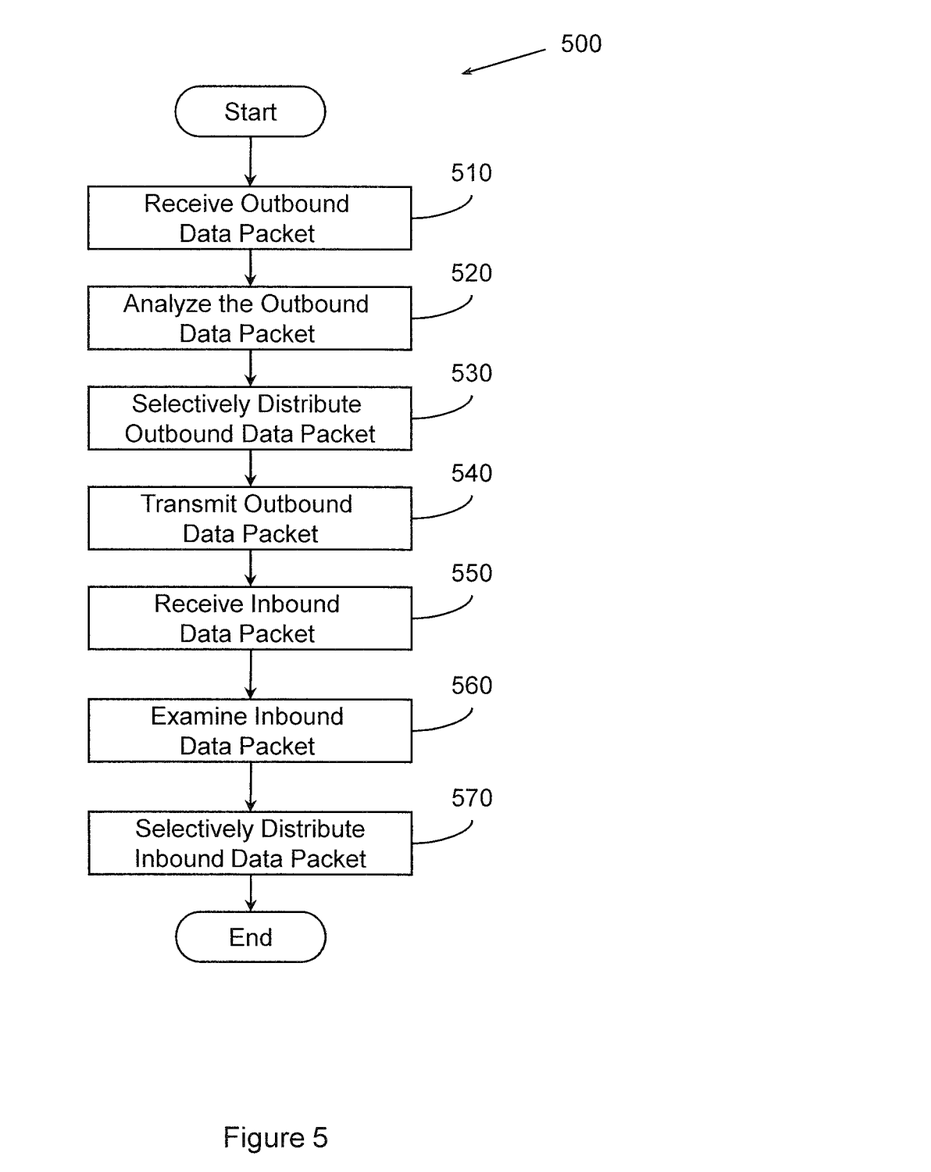
FIG. 5 illustrates an example method associated with aggregation of cryptography engines.

FIG. 5 illustrates a method 500 associated with aggregation of cryptography engines. Method 500 may include, at 510, receiving an outbound data packet. The outbound data packet may be from an aggregated crypto virtual group (ACVG) on an outbound side of a data connection.

Method 500 may also include, at 520, analyzing the outbound data packet. Analyzing the outbound data packet at 520 may be performed to determine a distribution value. The distribution value may be the result of a hash function performed on an element of the outbound data packet. The result of the hash function may be an index that may be used to distribute the outbound data packet.

In one embodiment, the distribution value is a first hash value based on an element of the outbound data packet. The identifier may be processed by a hash function to produce a second hash value. The first hash value maps an outbound data packet to an outbound processor. The second hash value maps an inbound data packet to an inbound processor. The hash function may generate the hash value based, at least in part, on the SPI.

Method 500 may also include, at 530, selectively distributing the outbound data packet to one of a plurality of outbound processors based, at least in part, on the distribution value. An outbound processor may be an encryption engine that encrypts the outbound data packet before it traverses an unsecure network. The selectively distribution to outbound processors may be performed to load balance encryption processing between multiple encryption engines thereby allowing parallel processing of multiple data packets. This increases the effective data encryption speed of a network and increases network speed. In one embodiment, the outbound processor is to encrypt the outbound data packet for secure transmission across the data connection.

Method 500 may also include, at 540, transmitting the outbound data packet. The outbound data packet may have been processed by an outbound processor that encrypted the outbound data packet. The outbound data packet may be transmitted across a data connection. The data connection may be an unsecure data connection that requires encryption to maintain confidentiality of the data. In one embodiment, the data connection is a VPN. The VPN may utilize a virtual tunnel to seamlessly transmit data across an unsecure network.

Method 500 may also include, at 550, receiving an inbound data packet. The inbound data packet may be received at 550 on an inbound side of the data connection. Method 500 may also include, at 560, examining the inbound data packet. The inbound data packet may be examined for an identifier at 560. The identifier may be an SPI, a header, a section of the data packet, and so on. The identifier may be used by a hash function to determine a hash value that may be used as a distribution index.

Method 500 may also include, at 570, selectively distributing the inbound data packet. Selectively distributing the inbound data packet at 570 may involve distributing the inbound data packet to one of a plurality of inbound processors based, at least in part, on the identifier and/or on the distribution index. In one embodiment, an inbound processor is to decrypt the inbound data packet.

While FIG. 5 illustrates various actions occurring in serial, it is to be appreciated that various actions illustrated in FIG. 5 could occur substantially in parallel. By way of illustration, a first process could receive an outbound data packet at 510, a second process could selectively distribute the outbound data packet at 530, a third process could receive an inbound data packet at 550, and a fourth process could selectively distribute the inbound data packet at 570. While four processes are described, it is to be appreciated that a greater and/or lesser number of processes could be employed and that lightweight processes, regular processes, threads, and other approaches could be employed.

In one example, executable instructions associated with performing a method may embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method associated with aggregation of cryptography engines. While executable instructions associated with the above method are described as being embodied as a logic encoded in one or more tangible media, it is to be appreciated that executable instructions associated with other example methods described herein may also be stored on a tangible media. A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 6:
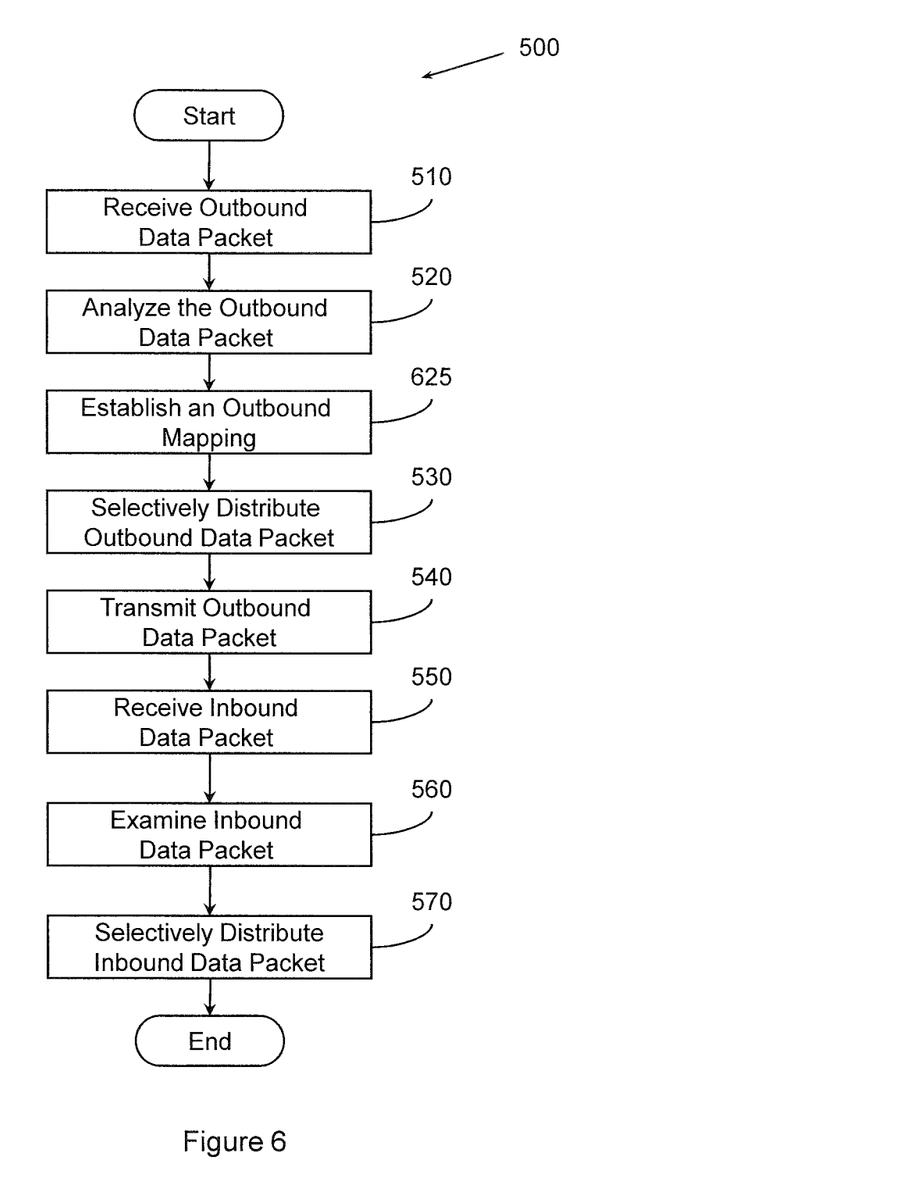
FIG. 6 illustrates an example method associated with aggregation of cryptography engines.

FIG. 6 illustrates another embodiment of method 500 associated with aggregation of cryptography engines. This embodiment of method 500 may also include, at 625, establishing an outbound mapping. Establishing an outbound mapping at 625 may include establishing a mapping between a set of distribution values and the plurality of outbound processors. The mapping may map indexes associated with a hash function of the outbound data packet to the plurality of outbound processors.

Figure 7:
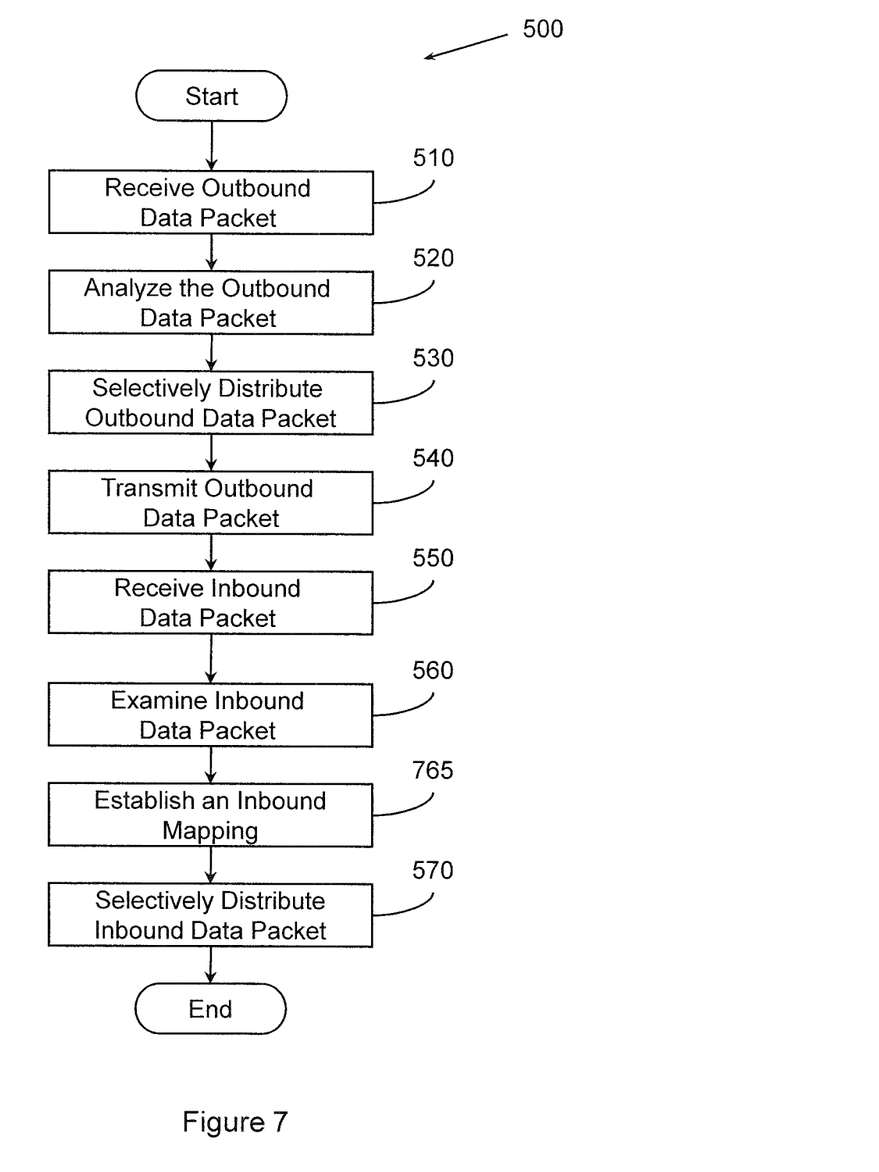
FIG. 7 illustrates an example method associated with aggregation of cryptography engines.

FIG. 7 illustrates another embodiment of method 500 associated with aggregation of cryptography engines. This embodiment of method 500 may also include, at 765, establishing an inbound mapping. Establishing an inbound mapping at 765 may include establishing a mapping between a set of identifiers and a plurality of inbound processors. The mapping may map indexes associated with a hash function to the plurality of inbound processors. In one embodiment, the outbound mapping includes a one to one correspondence between the plurality of outbound processors and the plurality of inbound processors of the inbound mapping.

Figure 8:
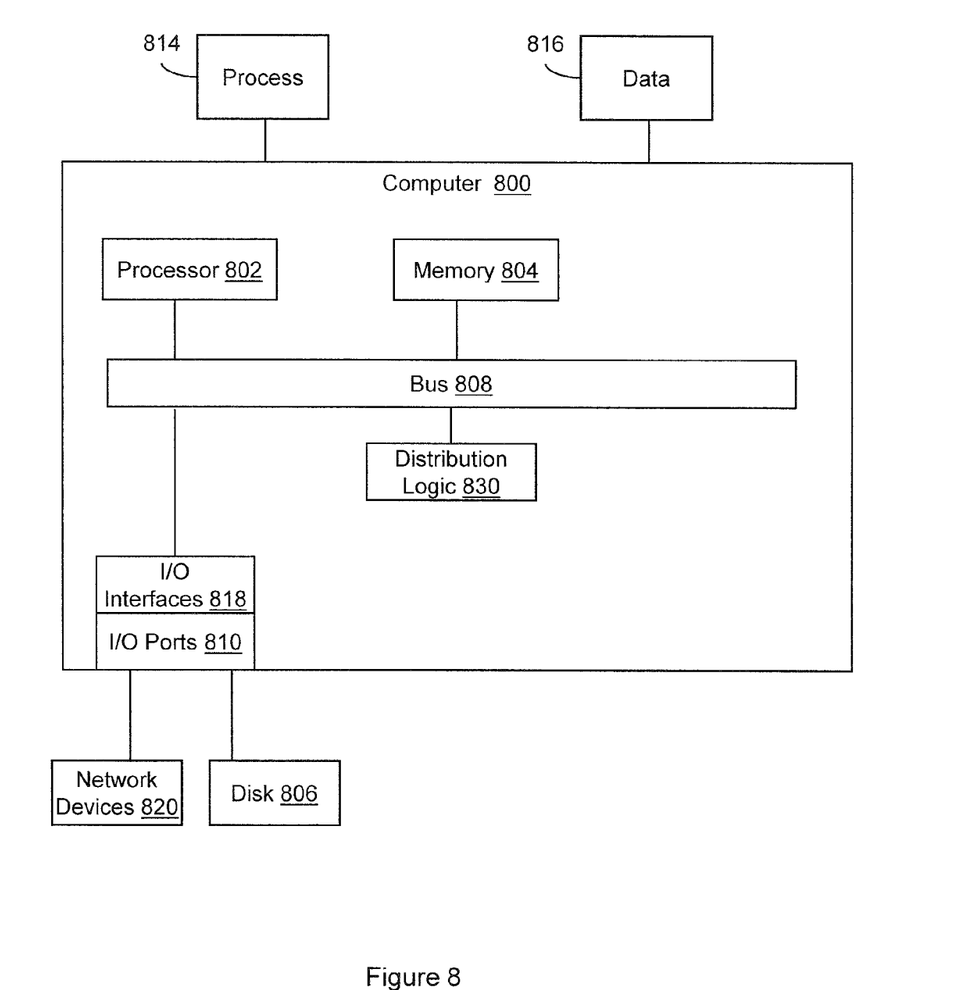
FIG. 8 illustrates an example computing environment in which example systems and methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection. In one example, the computer 800 may include a distribution logic 830 configured to facilitate aggregation of cryptography engines. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

Thus, logic 830 may provide means (e.g., hardware, software, firmware) for generating an outbound hash value associated with an outbound data packet on an outbound side of a data connection. The outbound hash value is based on an element of the outbound data packet. The means may be implemented, for example, as an ASIC programmed to aggregate cryptography engines. The means may also be implemented as computer executable instructions that are presented to computer 800 as data 816 that are temporarily stored in memory 804 and then executed by processor 802.

Logic 830 may also provide means (e.g., hardware, software, firmware) for selectively distributing the outbound data packet to one of a plurality of cryptography engines based, at least in part, on the outbound hash value. A cryptography engine is to encrypt a data packet into an encrypted data packet for secure distribution across a data connection associated with the ACVG.

Logic 830 may also provide means (e.g., hardware, software, firmware) for receiving an inbound data packet on an inbound side of the data connection. Logic 830 may also provide means (e.g., hardware, software, firmware) for examining the inbound data packet for an identifier. Logic 830 may also provide means (e.g., hardware, software, firmware) for selectively distributing the inbound data packet to one of a plurality of inbound decryption engines based, at least in part, on the identifier.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD recordable (CD-R) drive, a CD rewriteable (CD-RW) drive, a digital versatile disk and/or digital video disk read only memory (DVD ROM), and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., peripheral component interconnect express (PCIE), 1394, universal serial bus (USB), Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
a receive logic device to receive a data packet associated with an aggregated crypto virtual group (ACVG), where the ACVG is associated with distributing data to aggregate bandwidth in a distributed forwarding architecture;
a hash logic device to generate a hash value associated with the data packet, where the hash value is based on an element of the data packet, where the element is one of, a non-encrypted portion of the data packet, and a non-encrypted portion of the data packet header;
an outbound mapping data store device to store a set of mappings between a set of hash values and a plurality of cryptography engines, where the set of mappings comprises the hash value generated for the data packet; and
a distribution logic device to determine a cryptography engine, of the plurality of cryptography engines, based, at least in part, on the hash value and the set of mappings, and selectively distribute the data packet to the cryptography engine, where the cryptography engine is to encrypt the data packet for secure distribution across a data connection associated with the ACVG.

2. The apparatus of claim 1, where one or more of, the receive logic device, the hash logic device, and the distribution logic device are embodied in an ether channel logic device.

3. The apparatus of claim 1, further comprising an aggregation logic device to create a set of security associations (SOSAs) to enable secure communication between networking devices over a plurality of channels associated with the data connection, where a security association (SA) is a logical grouping of security parameters that includes one or more of, cryptographic keys, initialization vectors, and digital certificates.

4. The apparatus of claim 3, where the SA is to share security information between two networks, where data packets include a security parameter index (SPI) that includes information that differentiates between the SOSAs of different data traffic streams, and where the SPI includes data to identify data encryption rules and data validation rules for data traffic streams.

5. The apparatus of claim 4, where the element of the data packet is a security parameter index (SPI), and where the hash logic device generates the hash value based on the SPI.

6. The apparatus of claim 4, where the data packets are associated with a Group Encrypted Transport Virtual Private Network (GetVPN) and where the data packets include an Internet Protocol (IP) address upon which the hash logic device is to operate.

7. The apparatus of claim 4, where the aggregation logic device further controls transmission of an encrypted layer three (L3) switched frame over the data connection, where the encrypted L3 switched frame is to be encrypted by one of the plurality of cryptography engines, and where the L3 switched frame includes a data payload and a security parameter index (SPI) header.

8. The apparatus of claim 4, where the aggregation logic device further controls transmission of an encrypted layer two (L2) switched frame over the data connection, and where the hash logic device is to generate the hash value as a function of a portion of the L2 switched frame.

9. The apparatus of claim 4, where the data connection is a tunnel associated with a virtual private network (VPN), and where the tunnel utilizes a layer two tunneling protocol (L2TP) or an internet protocol security (IPSec) process.

10. An apparatus, comprising:
a plurality of receive input ports (RIPs) to receive encrypted data packets associated with an aggregated crypto virtual group (ACVG), where the ACVG is associated with distributing data to aggregate bandwidth in a distributed forwarding architecture;
an inbound mapping data store device to store a set of mappings between hash values and a plurality of decryption engines; and
an examination logic device to:
determine a hash value of an encrypted data packet based, at least in part, on an element of the encrypted data packet; and
based on the hash value and the set of mappings, determine a decryption engine, from the plurality of decryption engines;
selectively distribute the encrypted data packet from one of the plurality of RIPs to the decryption engine, of the plurality of decryption engines; where the decryption engine is to decrypt the encrypted data packet, and where the set of mappings comprises the hash value determined for the encrypted data packet.

11. The apparatus of claim 10, further comprising:
a receive logic device to receive a data packet associated with the ACVG on an outbound side of the data connection;
a hash logic device to generate an outbound hash value associated with the data packet, where the outbound hash value is based on the element of the data packet;
an outbound mapping data store device to store the set of mappings between a set of hash values and a plurality of cryptography engines; and a distribution logic device to selectively distribute the data packet to one of the plurality of cryptography engines based, at least in part, on the outbound hash value, where a cryptography engine is to encrypt the data packet into the encrypted data packet for secure distribution across the data connection associated with the ACVG.

12. The apparatus of claim 11, further comprising a mapping logic device to create the set of mappings between the set of hash values and the plurality of decryption engines and to create the set of mappings between the set of hash values and the plurality of cryptography engines, where the mapping logic device provides the set of mappings between the hash values and the plurality of decryption engines to the inbound mapping data store device, and where the mapping logic device provides the set of mappings between the set of hash values and the plurality of cryptography engines to the outbound mapping data store device.

13. The apparatus of claim 10, where the decryption engine is to decrypt the encrypted data packet based on information associated with a security parameter index (SPI).

14. The apparatus of claim 10, where the element of the encrypted data packet that the hash value is determined upon is a security parameter index (SPI).

15. The apparatus of claim 10, where the aggregated crypto virtual group is associated with a virtual private network that employs a layer two tunneling protocol (L2TP) or an Internet Protocol Security (IPSec) process.

16. Logic encoded in one or more non-transitory tangible media for execution and when executed operable to perform a method, the method comprising:
receiving an outbound data packet from an aggregated crypto virtual group (ACVG) on an outbound side of a data connection, where the ACVG is associated with distributing data to aggregate bandwidth;
analyzing the outbound data packet to determine a distribution value for the outbound data packet;
storing a set of mappings between a set of distribution values and a plurality of outbound processors, where the set of mappings comprises the distribution value determined for the outbound data packet;
based on the set of mappings and the distribution value, determine an outbound processor, of the plurality of outbound processors;
selectively distributing the outbound data packet to the outbound processor, of the plurality of outbound processors;
where the outbound processor is to encrypt the outbound data packet for secure transmission across the data connection;
transmitting the outbound data packet processed by the outbound processor across the data connection;
causing:
receiving an inbound data packet on an inbound side of the data connection;
examining the inbound data packet for an identifier; and
selectively distributing the inbound data packet to one of a plurality of inbound processors based, at least in part, on the identifier.

17. The logic of claim 16, where the distribution value is a first hash value based on an element of the outbound data packet, where the identifier is processed by a hash function to produce a second hash value, where the first hash value maps the outbound data packet to the outbound processor, and where the second hash value maps the inbound data packet to an inbound processor.

18. The logic of claim 17, where the element of the outbound data packet is one of, a security parameter index (SPI), an Internet Protocol (IP) address, and a layer two element, and where the hash function generates the first hash value and the second hash value based, at least in part, on one of, the SPI, the IP address, and the layer two element.

19. The logic of claim 17, where the inbound processor is to decrypt the inbound data packet, and where the data connection is associated with one of, a virtual private network (VPN), and a network.

20. The logic of claim 16, further operable to perform a method comprising:
establishing an outbound mapping between the set of distribution values and the plurality of outbound processors; and
establishing an inbound mapping between a set of identifiers and the plurality of inbound processors.

21. The logic of claim 20, where the outbound mapping includes one to one correspondence between the plurality of outbound processors and the plurality of inbound processors, and where the one to one correspondence prevents anti-replay errors.

22. A method, comprising:
generating an outbound hash value associated with an outbound data packet on an outbound side of a data connection, where the outbound hash value is based on an element of the outbound data packet;
storing a set of mappings between a set of hash values and a plurality of cryptography engines, where the set of mappings comprises the outbound hash value generated for the outbound data packet;
determining a cryptographic engine, of the plurality of cryptography engines, based, at least in part, on the outbound hash value and the set of mappings;
selectively distributing the outbound data packet to the cryptographic engine, where the cryptography engine is to encrypt the outbound data packet into an encrypted data packet for secure distribution across the data connection;
causing:
receiving an inbound data packet on an inbound side of the data connection;
examining the inbound data packet for an identifier; and
selectively distributing the inbound data packet to one of a plurality of inbound decryption engines based, at least in part, on the identifier;
wherein the method is performed by one or more computing devices.

* * * * *